(12) United States Patent
Tommasi et al.

(10) Patent No.: US 11,630,649 B2
(45) Date of Patent: Apr. 18, 2023

(54) INTELLIGENT APPLICATION LIBRARY MANAGEMENT

(71) Applicant: INTERNATIONAL BUSINESS MACHINES CORPORATION, Armonk, NY (US)

(72) Inventors: Pierpaolo Tommasi, Dublin (IE); Debasis Ganguly, Dublin (IE); Stephane Deparis, Dublin (IE); Alessandra Pascale, Phoenix Parks Racecourse (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 401 days.

(21) Appl. No.: 15/929,997

(22) Filed: Jun. 2, 2020

(65) Prior Publication Data
US 2021/0374558 A1    Dec. 2, 2021

(51) Int. Cl.
| *G06F 8/70* | (2018.01) |
| *G06F 8/36* | (2018.01) |
| *G06F 16/22* | (2019.01) |
| *G06N 20/00* | (2019.01) |

(52) U.S. Cl.
CPC ............... *G06F 8/36* (2013.01); *G06F 8/70* (2013.01); *G06F 16/2228* (2019.01); *G06N 20/00* (2019.01)

(58) Field of Classification Search
CPC .......... G06F 8/36; G06F 8/70; G06F 16/2228; G06N 20/00

USPC .............................................. 706/12
See application file for complete search history.

(56) References Cited

U.S. PATENT DOCUMENTS

| 7,499,861 | B2 * | 3/2009 | Danieli ................... G10L 15/18 |
| | | | 704/275 |
| 10,033,799 | B2 | 7/2018 | Spivack et al. |
| 10,438,170 | B2 * | 10/2019 | Kozloski .............. G06Q 10/101 |
| 11,262,979 | B2 * | 3/2022 | Deshmukh ............. G06N 20/00 |
| 11,475,053 | B1 * | 10/2022 | Das ........................ G06F 40/30 |
| 2019/0146762 | A1 | 5/2019 | Singh et al. |
| 2019/0265970 | A1 | 8/2019 | Saha et al. |
| 2021/0056095 | A1 * | 2/2021 | Srivastava .......... G06F 16/2379 |
| 2021/0182131 | A1 * | 6/2021 | Reuzel ................ G06F 21/6218 |
| 2021/0261949 | A1 * | 8/2021 | Serber ................ G01N 35/1002 |
| 2021/0311926 | A1 * | 10/2021 | Ponceleon .............. G06F 21/12 |

OTHER PUBLICATIONS

Title: Sibilla: An implementation of an intelligent library management system; author: G Patrizi , published on 1993.*

(Continued)

*Primary Examiner* — Chameli Das
(74) *Attorney, Agent, or Firm* — Griffiths & Seaton PLLC

(57) ABSTRACT

Various embodiments are provided for providing intelligent library management in a computing environment by a processor. Application compatibility may be learned from a plurality of projects, repositories, application libraries, data sources, or a combination thereof. A list of recommended application libraries, ordered according to the application compatibility, may be automatically provided for implementation, integration, or replacements of one or more sections of an application library.

17 Claims, 10 Drawing Sheets

(56) References Cited

OTHER PUBLICATIONS

Title: Weka: Practical machine learning tools and techniques with Java implementations, author: IH Witten, et al, published on 1999.*
Title: Predicting Class Libraries Interface Evolution: an investigation into machine learning approaches author: HA Sahraoui et al, published on 2000.*
"Using Regular Expressions for Mining Data in Large Software Repositories" Normi Sham Awang Abu Bakar Apr. 10, 2019 International Islamic University Malaysia (6 Pages).

* cited by examiner

INTELLIGENT APPLICATION LIBRARY MANAGEMENT

BACKGROUND OF THE INVENTION

Field of the Invention

The present invention relates in general to computing systems, and more particularly, to various embodiments for providing intelligent application library management in a computing environment using a computing processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. Computing systems can include an Internet of Things (IoT), which is the interconnection of computing devices scattered across the globe using the existing Internet infrastructure. IoT devices may be embedded in a variety of physical devices or products for assisting in improvements to the quality of life and appropriate living accommodations.

SUMMARY OF THE INVENTION

Various embodiments for providing intelligent library management in a computing environment by a processor, are provided. In one embodiment, by way of example only, a method for providing intelligent application library management (e.g., smart library manager operations) in a computing environment, again by a processor, is provided. Application compatibility may be learned from a plurality of projects, repositories, application libraries, data sources, or a combination thereof. A list of recommended application libraries, ordered according to the application compatibility, may be automatically provided for implementation, integration, or replacements of one or more sections of an application library.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
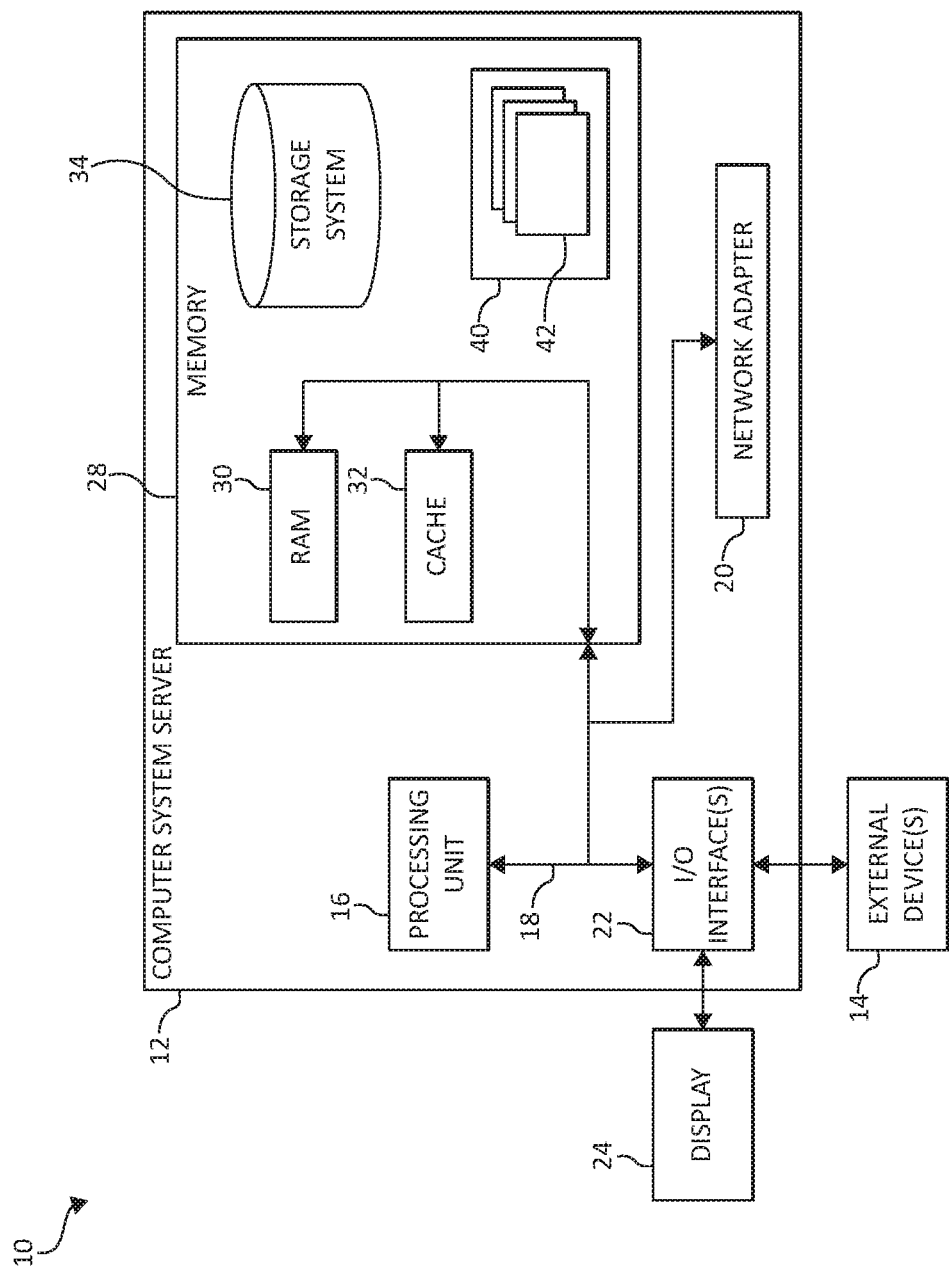
FIG. 1 is a block diagram depicting an exemplary cloud computing node according to an embodiment of the present invention.

Current application development (e.g., "software development") systems rely heavily on human involvement, especially during early phases of application development. Humans (e.g., application developers or "software developers") are needed to understand the problem description the application is asked to solve and, further, to manually design and create the desired application.

During software development, many third party libraries are available to be downloaded and used such as, for example, in increasing the productivity of software developers, reducing the development time and maintenance cost, and improving software quality and reusability. However, using a third party application library (e.g., software library) presents difficulties and challenges particularly for application developers that may be unaware of suitable libraries thereby making a library search a tedious process. Also, library compatibility issues with the software may also be present at any stage. Licensing and pricing of a library may also add an extra layer of difficulty. This can create both a bottleneck in application development, as well as suboptimal results. Thus, a need exists for automatically importing and maintaining external libraries in a software project.

According, various embodiments as described herein for providing intelligent library management in a computing environment by a processor, are provided. In one embodiment, by way of example only, one or more application projects may be learned from a plurality of libraries, data sources, or a combination thereof. A list of recommended libraries may be automatically provided and ordered according to a degree of relevance or compatibility for implementation, integration, or replacements of one or more sections of the one or more application projects. Thus, the intelligent library management service (e.g., application/software management) provides for automatic online searching for software libraries based on a particular task. After an automatic software library search, each candidate library may be analyzed and validate that the candidate library is compatible with any other part of an application (e.g., software code (it fits), computationally efficient and with a defined budget constraint, along with being void of any licensing restrictions).

In an additional aspect, various embodiments, described herein, provides for learning one or more software projects available online, collecting feedback from user and/or from any integration tool, and outputting a ranked list of libraries (ordered by relevance/compatibility) together with possible issues, to either the project as a whole or to a specific keyword-based query (e.g. 'chart library'). Software library content from relevant sources (git repository, companies private, rational team concert "RTC" repositories, etc.) may be searched/crawled. Data fetched from the searching/crawling operation may be used for training. That is, a compatibility model that holds the compatibility information among all the software libraries (e.g. a machine learning model understands/knows that ACME software version 2.0 will not work with ABCD software version 0.8) may be trained. The trained compatibility model may include software pairs that match as compared with software pairs that do not match. Using the compatibility model, the compatibility may be predicted between/across application/software pairs even for application/software pairs that have previously been unseen (e.g., an unknown software) using machine learning.

Based on a bundle of software libraries provided, a set of libraries and/or reports of possible warnings (e.g., incompatible libraries) may be provided/recommended. A semantic index may be generated, created, and/or provided from a known set of software libraries fetched by the searching/crawling operation, and, optionally fetches more metadata (e.g., licensing, pricing, known security flaws, etc.). All the available metadata about a set of libraries (including licensing issue, pricing alerts, etc.) may be learned, returned, and/or provided. Optionally, all the relevant libraries matching a user specified keyword query may also be learned, returned, and/or provided. The ranked list output may be augmented with all metadata. Optionally the ranked list output may be based on a user query. Feedback from a user and/or from any integration tool may be learned, collected, and/or received to update training data.

To further illustrate, consider the following three examples relating to 1) a software project bootstrap recommendations, 2) adding new features to an existing software project, and/or 3) modifying an existing project In example 1, for project bootstrap recommendation, assume user 1 is booting a new Python (e.g., programming language) project and commences to write with a "requirements.txt" file with all the dependencies (e.g., a list of required application/software libraries). For example, among other dependencies, user 1 is importing a selected software library and version (e.g., pandas version 0.23.4) and the latest flask. An integrated development environment ("IDEs") may, at most, recommend upgrading the selected software library to version 0.25.0 (e.g., recommending a most recent application/software version). In contrast, however, the aspects of the present invention would make recommendations based on the project of user 1 and would recommend importing an alternative software library and version such as, for example, numpy version 1.15.4, which works best and is more compatible with the selected software library and version (e.g., pandas 0.23.4), since the alternative software library and version may typically be bundled with the selected software library and version (e.g., pandas). Additionally, the present invention may recommend importing a most compatible version of an additional, alternative software library (e.g., tornado) since it is often bundled with "flask". There may be approval for used licenses and prices on both recommendations. Thus, user 1 may select to import the alternative software library and version such as, for example, numpy version 1.15.4, and the system may then collect feedback (e.g., positive and/or negative feedback). User 1 may also be enabled to select to hide the additional, alternative software library (e.g., tornado), and the system would then collect a negative feedback. For example, assume a recommender (e.g., a recommendation component 404 of FIG. 4) selected a wrong suggestion so if multiple application/software developers routinely or continuously ignore a suggestion, the feedback from the application/software developers assists in learning that the suggestion is incorrect, non-applicable/non-compatible, useless, and/or a wrong recommendation, which feedback may be used for enhancing a machine learning training operation and adjusting, correcting, and/or updating one or more application/software library suggestions.

In example 2, for adding new features to existing project, assume user 2 desires to update a react based e-commerce website with some charts, but does not know any libraries that would simplify the user 2's task. Usually, the user would search online for charting libraries (e.g., attempting with different keywords). There would be an overwhelming high amount of results from advertisement, articles, software development platform (e.g., GitHub) repositories, companies websites, etc. For each potential candidate, user 2 would be required to check: (1) if the library is allowed to be used, (2) if the library fits in the project and, in a worst case, does not create a conflict, and (3) if the library has an acceptable cost. Depending on how much time user 2 has, user 2 would end up focusing on one or more options and select the one that seems the most promising. Although it is not free, she would select a first software library (e.g., HighCharts) for her company, given the convincing online support.

A month after, talking with a fellow colleague, user 2 finds out that an alternative software library (e.g., Nivo, which may not have been provided/showed up in a search because the library "Nivo" did not contain the word "chart" in its description) would have been much easier to implement given her stack of technologies. In contrast, the present invention provides for automatically searching "charts" and return one or more charting, software libraries that fits or is compatible with user 2's stack, which may be automatically extracted from the dependencies in the "package.json" file. The alternative software library (e.g., Nivo), despite having "chart" neither in the name nor description may be the first option having a determined "optimized" or highest compatibility score and an approval on license uses. The otherwise manually selected software library (e.g., HighCharts), despite having "chart" in its name and description, which would strongly be favored in a classic package search), would have a low ranking, with a warning on the commercial license with licensing costs exceeding a defined licensing cost threshold. Feedback, similar to the feedback discussed in example 1, may also be collected using a machine learning operation and/or directly from the user.

In example 3, for modifying an existing project, assume user 3 wants to use a new feature from the latest version of a software library (e.g., Spring Boot) in a particular microservices (e.g., Java® micro service). Being part of a larger product, user 3 may be using an open source automation server (e.g., Jenkins) configured for Continuous Integration, as well as many proprietary libraries belonging to user 3's company (and shared among projects) imported in a project object model "pom.xml" file. Currently, user 3 would attempt to upgrade the software library locally, check for correctness, and push the updates for open source automation server (e.g., Jenkins) to be triggered. If an error occurs locally, user 3 is required to reverse the changes and spend a large amount of time proportional to the amount and complexity of said changes. If an error occurs during the integration phase, it could have been already propagated in the codebase and it would take additional time to fix and reverse the modification. If insufficient practices have been followed such practices may negatively impact a project significantly, with all other teams blocked from hours to days.

In contrast, the present invention may monitor the "pom.xml" file for changes either on employee laptop either on company server (e.g. using various Continuous Integrations/Continuous Delivery tools ("CI/CD")). If a particular colleague's build fails and/or CI/CD build fails, that would be a learned negative feedback. Any attempt from other colleagues may also generate a warning that the integration will fail, saving time (and cost).

Said differently, in modern application/software development, an application/software is built at different stages and different locations, with checkpoints everywhere to ensure an application/software crash is avoided once placed in production (e.g., testing the software to ensure it does not break during use following implementation). The first stage is the developer machine: a developer is writing the code, building locally, and checking that everything relating to the software codes is functioning. If the software codes crashes/breaks, the software developer may immediately fix/correct the cause of the crash/break. However, just because the software code did not crash/break on the developer machine, does not mean the software code will not crash/break in the future. When the developer submits the software code, the CI/CD takes care to build the software from scratch again, and checks for errors. This process is more thorough than the developer quick check. Using the mechanisms of the illustrated embodiments, the present invention may realize that a library has been imported and that the library caused a crash or broke several aspects of the total application (negative feedback) or not (positive feedback). Since there are many checks, starting from a first development phase such as, for example, from the developer (e.g., local machine) going up a final phase such as, for example, up to the server (e.g., a remote machine), the present invention monitors any stage and learns how each application/software library impacts a project. It should be noted that as used herein, application and software may be used interchangeably and should not be construed as limiting.

Thus, as described herein, the present invention provides for intelligent application library management (e.g., smart library manager operations) in a computing environment. Application compatibility may be learned from a plurality of projects, repositories, application libraries, data sources, or a combination thereof. A list of recommended application libraries, ordered according to the application compatibility, may be automatically provided for implementation, integration, or replacements of one or more sections of an application library.

As used herein, by way of example only, "best," "appropriate," and/or "optimize" may be used herein interchangeable and refer to and/or defined as "maximize," "minimize," or attain one or more specific targets, objectives, goals, or intentions. "Best," "appropriate," and/or "optimize" may also refer to maximizing a benefit to a user (e.g., maximize a workflow pipeline). "Best," "appropriate," and/or "optimize" may also refer to making the most effective or functional use of a situation, opportunity, or resource.

Additionally, "best," "appropriate," and/or "optimize" may need not refer to a best solution or result but may refer to a solution or result that "is good enough" for a particular application, for example. In some implementations, an objective is to suggest a "best" combination of sections/items/defined objects, but there may be a variety of factors that may result in alternate suggestion of a combination of sections/items/defined objects/activities/applications yielding better results. Thus, some changes to the variety of factors may result in a jump from one minimum/maximum to another minimum/maximum. In either case, resulting suggestions of a combination of sections/items/defined objects/activities/applications of the optimal/best executor nodes may be determined by whatever "function" may be considered "good enough," "substantially optimal," and/or "sufficiently good." Herein, the terms "best," "appropriate," and/or "optimize" may also refer to such results based on minima (or maxima, depending on what parameters are considered in the optimization problem) for suggesting of a combination of optimal/best applications, programs, and/or computing components.

In an additional aspect, the terms "optimize" and/or "optimizing" may refer to an operation performed in order to achieve an improved result such as, for example, reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16 (which may be referred to herein individually and/or collectively as "processor"), a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
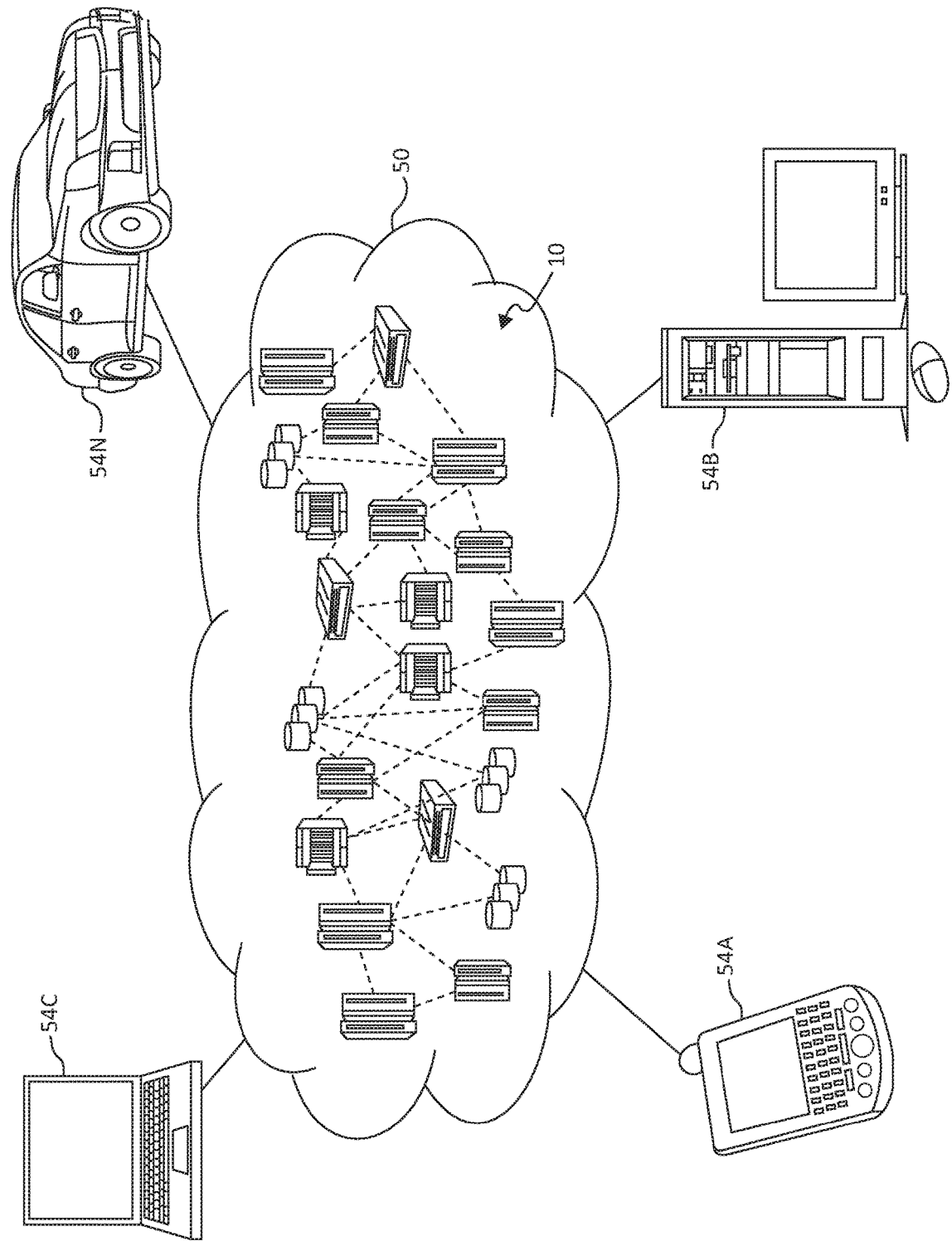
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
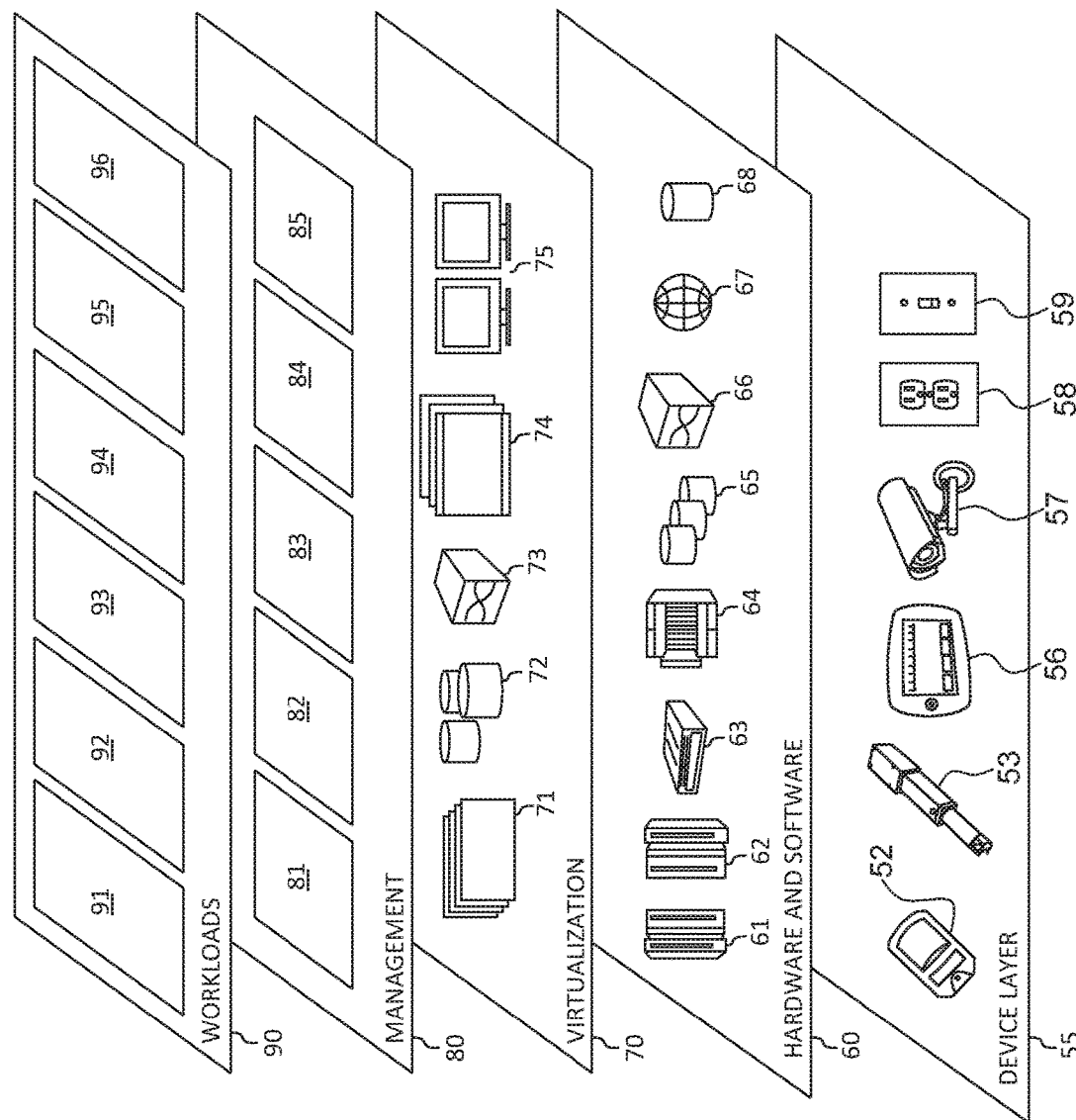
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for facilitating data exploration of probabilistic models. In addition, workloads and functions 96 for facilitating data exploration of probabilistic models may include such operations as data analysis, machine learning (e.g., artificial intelligence, natural language processing, etc.), user analysis, IoT sensor device detections, operation and/or analysis, as will be further described. One of ordinary skill in the art will appreciate that the workloads and functions 96 for facilitating data exploration of probabilistic models may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the present invention provides for visualization and exploration of probabilistic models in a computing environment. A multidimensional dataset may be received. The multidimensional dataset may be processed according to booting operation parameters. A visualization and exploration of an interactive representation of one or more probabilistic models using multidimensional dataset.

Figure 4:
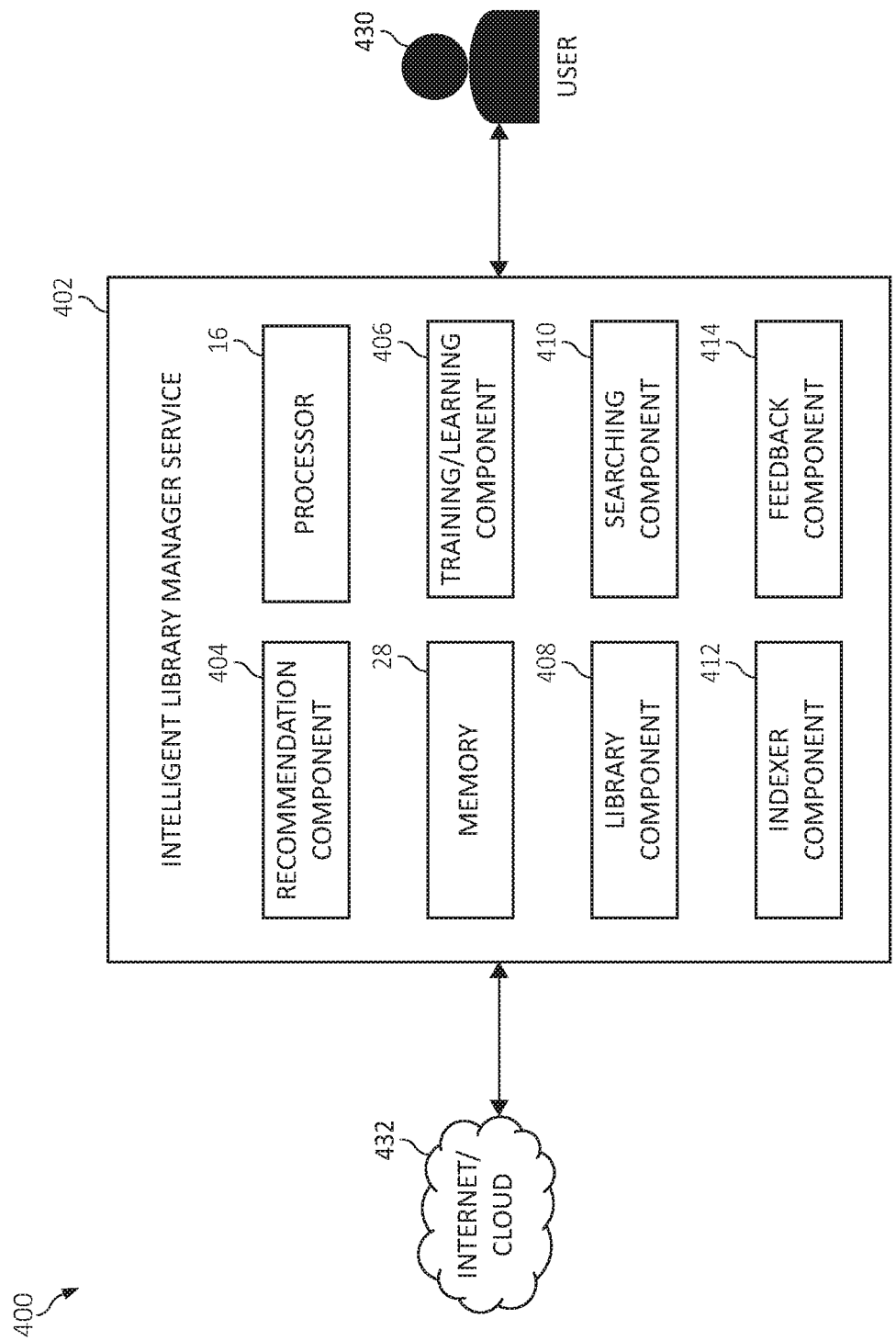
FIG. 4 is an additional block diagram depicting an exemplary functional relationship between various aspects of the present invention.

Turning to FIG. 4, a block diagram of various hardware 400 equipped with various functionality as will be further described is shown in which aspects of the mechanisms of the illustrated embodiments may be realized. In one aspect, one or more of the components, modules, services, applications, and/or functions described in FIGS. 1-3 may be used in FIG. 4.

For example, computer system/server 12 of FIG. 1 may be included in FIG. 4 and may be connected to other computing nodes over a distributed computing network, where additional data collection, processing, analytics, and other functionality may be realized. The components of computer system/server 12 may include, but are not limited to, one or more processors or processing units 16 ("processor") and/or a system memory 28.

The computer system/server 12 of FIG. 1, may include an intelligent library manager service 402, along with other related components. The intelligent library manager service 402 may include a recommendation component 404, a training/learning component 406, a library component 408, a searching operation component 410, an indexer component 412, and a feedback component 414. Additionally, the intelligent library manager service 402 may be in communication with network 432 (e.g., communication network, internet, cloud computing system) and/or one or more users such as, for example, user 430.

In one aspect, the intelligent library manager service 402 of FIG. 4 (e.g., using the recommendation component 404, the training/learning component 406, the library component 408, the searching operation component 410, the indexer component 412, and/or the feedback component 414) may learn application compatibility from a plurality of libraries, data sources, or a combination thereof. The plurality of libraries and/or data sources may be repositories provide by the network 432. In one aspect, the intelligent library manager service 402, such as, for example, via the recommendation component, may automatically provide a list of recommended libraries, ordered according to a degree of relevance or compatibility for implementation, integration, or replacements of one or more sections of the one or more application projects.

In an additional aspect, the searching component 410 may search or crawl the plurality of libraries to identify and learn the content therein. The recommendation component 404, in association with the library component 408, may recommend as the list of recommended libraries from the plurality of libraries to add or modify the one or more sections of the one or more application project. The recommendation component 404 may indicate those of the list of recommended libraries being potentially incompatible libraries with the one or more application projects.

The searching component 410, in association with the library component 408, may search, crawl, and/or retrieve from the plurality of libraries a list of recommended libraries, metadata, or a combination thereof. The library component 408 may create semantic index from the list of recommended libraries.

The recommendation component 404, in association with the library component 408, may provide the list of recommended libraries (e.g., recommended application/software libraries) matching a defined query.

The recommendation component 404, in association with the library component 408 and/or the training/learning component 406, may rank the list of recommended libraries according to the degree of relevance or compatibility for implementation, integration, or replacements of one or more sections of the one or more application projects. The recommendation component 404, in association with the feedback component 414, the library component 408 and/or the training/learning component 406, may initiate a machine learning component to collect feedback and learn the one or more application projects from the plurality of libraries, the data sources, or a combination thereof.

The library component 408 may include and/or receive from an external source (e.g., external to the intelligent library manager service 402 such as the network 432) one or more libraries from one or more repositories, which may be integrated development environment and/or application/software development platforms.

The booting operation component 412 may define one or more booting operation parameters. That is, the booting operation component 412 may assist the searching component 410 and/or the training/learning component 406 for search, crawl, and/or retrieve from the plurality of libraries a list of recommended libraries and/or learning the one or more application projects from the plurality of libraries, the data sources, or a combination thereof.

In one aspect, by way of example only, the booting operation component 412 may define one or more booting operation to include 1) fetching projects and/or project dependencies, 2) training, learning, and/or computing a model of with all compatible libraries and library versions (e.g., Bayesian network, Markov chain, etc.) either offline or online, 3) and/or fetching and/or indexing metadata for each library.

It should be noted, that in one embodiment, by way of example only, the training/learning component 406 may perform a machine learning operation that may include, for example, an instance of IBM® Watson® such as Watson® Analytics (IBM® and Watson® are trademarks of International Business Machines Corporation). By way of example only, the training/learning component 406 may determine one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5A:
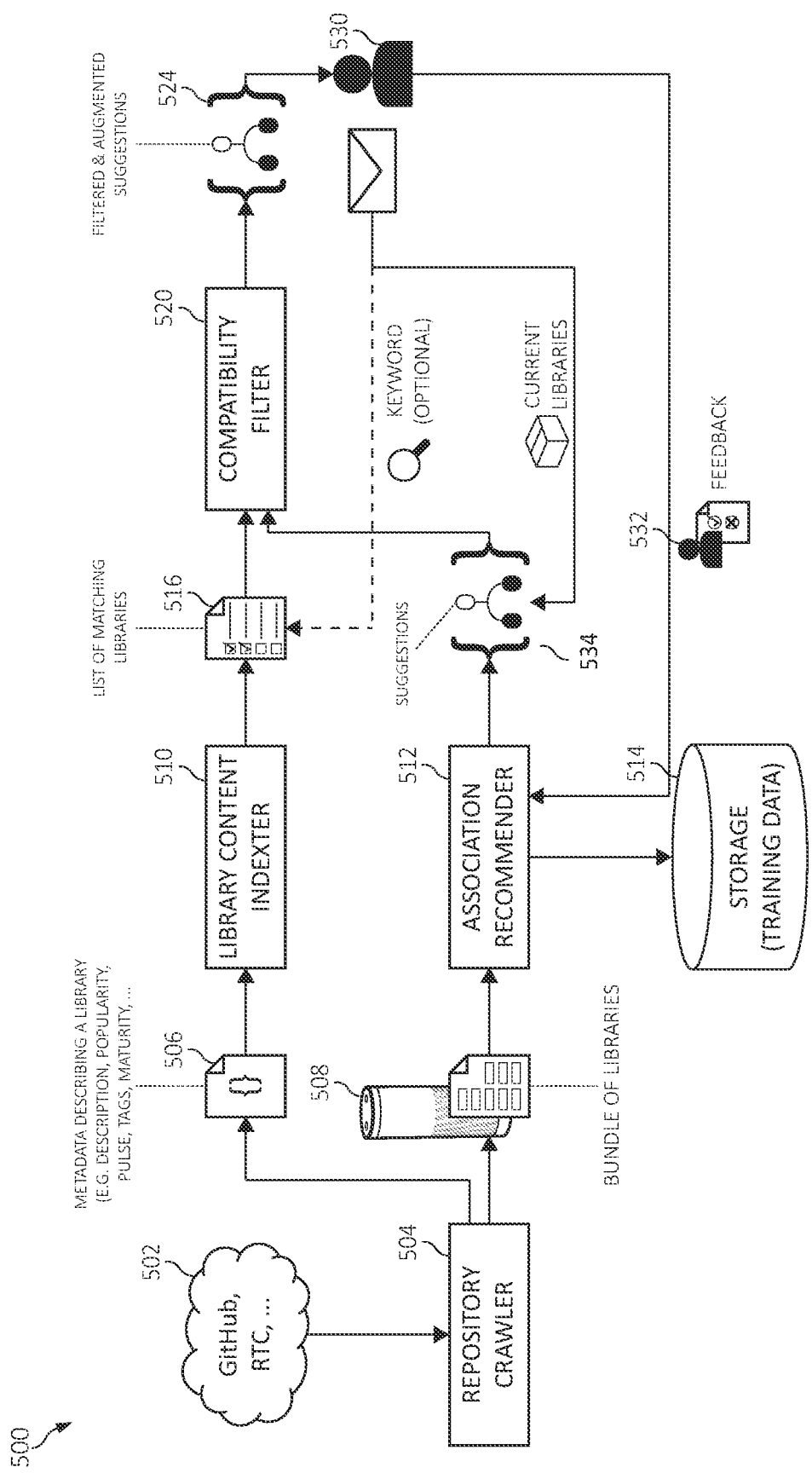
FIG. 5A-5B are block-flow diagram depicting an exemplary operation for providing intelligent application library management in which aspects of the present invention may be realized.
Figure 5B:
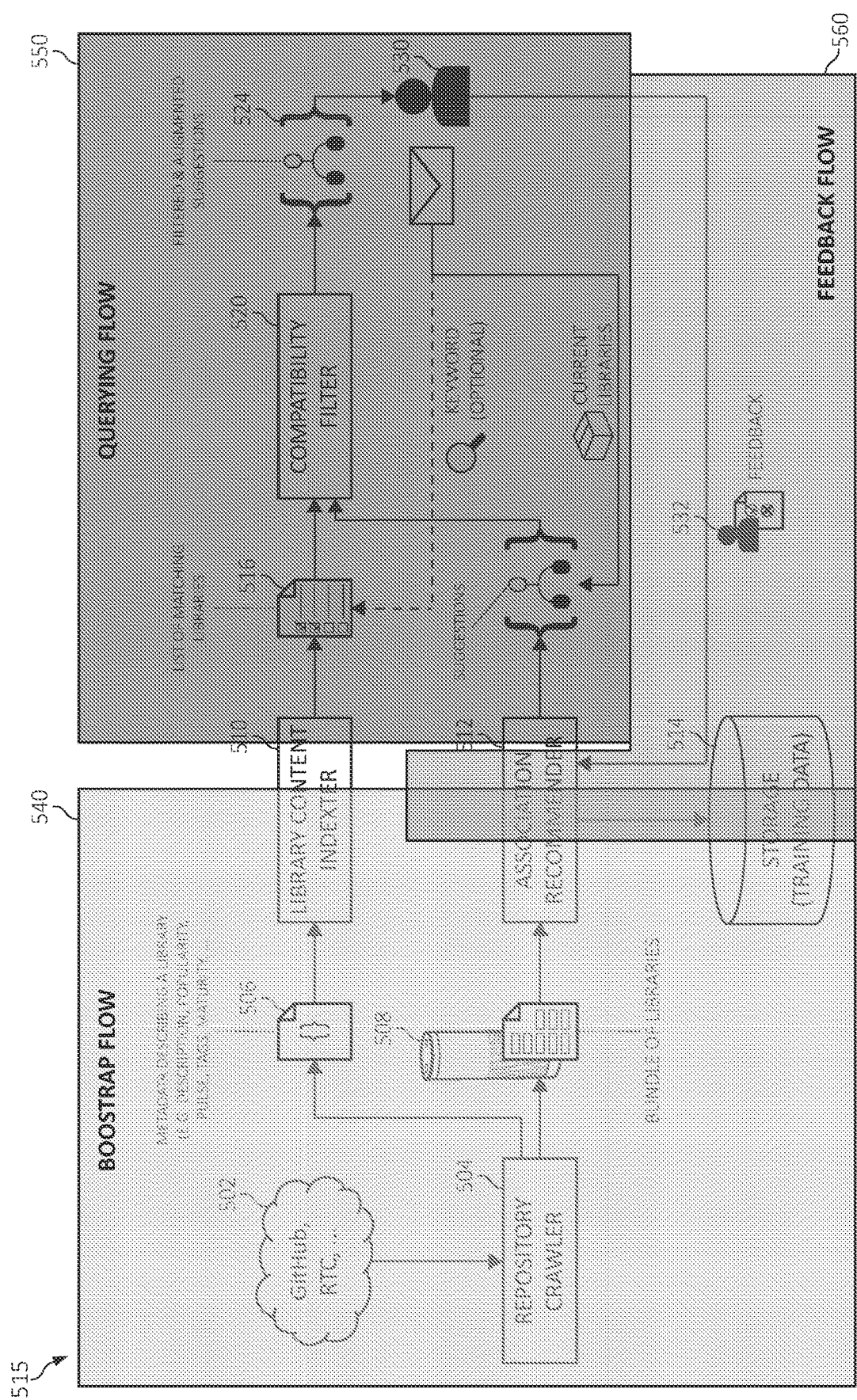

Turning now to FIGS. 5A-5B, are block-flow diagram of exemplary functionality 500 for providing intelligent application library management (e.g., software library management). FIG. 5A depicts an exemplary operation for exemplary operation for providing intelligent application library management according to various aspects of the present invention. FIG. 5B depicts those of the operations of FIG. 5A that perform bootstrap operations 540 (e.g., bootstrap flow), a querying operations 550 (e.g., querying flow), and feedback operations 560 (e.g., feedback flow).

As shown, the various blocks of functionality are depicted with arrows designating the blocks' 500 and 515 relationships with each other and to show process flow. Additionally, descriptive information is also seen relating each of the functional blocks' 500 and 515. As will be seen, many of the functional blocks may also be considered "modules" of functionality, in the same descriptive sense as has been previously described in FIGS. 1-4. With the foregoing in mind, the functional blocks' 500 and 515 may also be incorporated into various hardware and software components of a system for providing intelligent application library management in accordance with the present invention. Many of the functional blocks' 500 and 515 may execute as background processes on various components, either in distributed computing components, or on the user device, or elsewhere, and generally unaware to the user performing generalized tasks.

Starting in block 502, one or more application projects and/or application project dependencies may be fetched from one or more repositories using a repository crawler 504 where the repositories 502 may be an integrated development environment and/or application/software development platforms such as, for example, GitHub®, Visual Studio®, etc., that enable one or more users to share and collaboratively develop software, computer code and user-generated content. That is, the repository crawler 504 may crawls library content from relevant sources 502 (git repository, companies private rational team concert "RCT" repositories). Also, for each of the libraries, metadata 506 (e.g., description, pulse, maturity, etc.) may be fetched and indexed in a library content indexer 510. The repository crawler 504 crawls among all the available repositories (e.g., relevant sources 502) fetching all package manager files and exposing the package manager files as sets of libraries and library versions, together with available metadata. The metadata may be fetched by a repository manager (e.g., a nexus repository manager) associated with the repositories (e.g., relevant sources 502).

Association recommender 512 may learn to understand which of a variety of libraries 508 (e.g., a bundle of libraries) are related to each other, which may simplify input data as libraries and versions of each of the libraries. All training data (which may be storage 514) used to learn and understand which of a variety of libraries 508 (e.g., a bundle of libraries) are related to each other may be stored in a storage system 514.

It should be noted that "bundle" (e.g., bundle of libraries), as used herein, may describe a set of libraries and each version of each library. A bundle may be considered as a parsed file (e.g., a parsed a project object model (e.g., "pom.xml")/"requirements.txt"/"package.json" file), which may start from a dependency manager file and extract a similar file to a map with a key-value where the "key" is equal to the library name and the "value" is equal to its version).

The association recommender 512 may use the data fetched from the repository crawler 504 to train and learn the various libraries. A association recommender 512 may, based on the bundle of libraries 508 (which may be provided by a user 530 and/or the repository crawler 504) may recommends a set of libraries and reports possible warnings (e.g., incompatible libraries).

The library content indexer 510 stores all the metadata 506 about each library such as, for example, activity, popularity, stability, git pulse, licensing, known security flaws, cost/price, etc. The library content indexer 510 may provide metadata (used for specific ranking) and enable a search over the libraries and versions results provided by the association recommender 512. The library content indexer 510 may provide a list of matching libraries 516 (e.g., relevant libraries).

In an additional aspect, the library content indexer 510 may build a semantic index from a known/learned set of libraries fetched by the repository crawler 504. Also, the library content indexer 510 may return/provide metadata 506 (e.g., licensing metadata, pricing metadata, known security flaws metadata, etc.) and returns all the available metadata 506 about a set of libraries (including licensing, pricing alerts, security issues, etc.) The library content indexer 510 may optionally returns all the relevant libraries matching a user specified keyword query from a user request from user 530.

The library content indexer 510 may index the metadata 506 about a library for enabling efficient searching (e.g., searching based on various keywords, parameters, topics, semantics/characters such as, for example, name, description, licensing, pricing, popularity, pulse, maturity, stability, security flaws, etc.). The library content indexer 510 may fetch additional metadata 506 from external sources if required (e.g., an external source such as, for example, a website for pricing or licensing). At bootstrap (e.g., as depicted in bootstrap flow 540 depicted in FIG. 5B), the bootstrap flow 540 may use (e.g., take in as input) all the scanned library (and metadata, if already available). At bootstrap, the bootstrap flow 540 fetches additional metadata if required (e.g., licensing, pricing, etc.). When queried about a library (via the querying flow 550), the query returns all the metadata. If queried with keywords, the query returns the matching libraries (e.g., using semantic expansion).

Again, returning to the association recommender 512, the association recommender 512 is a core component for the querying based on a user bundle. At bootstrap, the association recommender 512 takes in input the bundles of libraries 508 from the repository crawler 504 and trains using the bundles of libraries 508. A training operation may be one or a combination of any machine learning algorithm (e.g., Bayesian network, collaborative filtering, business rules, etc.). Queried with a bundle (e.g., the content of "pom.xml" or "package.json"), the association recommender 512 may recommend libraries (with the library's version and confidence score), provide a report of possible issues (e.g., version incompatibilities, security flaws, licensing, etc.). The association recommender 512 takes as optional input feedback 532 from the user 530 and/or from a continuous integration "CI" and/or continuous delivery "CD" ("CI/CD") system for re-training.

A compatibility filter 520, which may be in association with the association recommender 512 and the library content indexer 510, may receive the list of matching libraries 516 and also one or more suggestions 518 (e.g., one or more recommendations of libraries). In an additional aspect, the compatibility filter 520 may function as a combining component to combine outputs from the association recommender 512 and the library content indexer 510. The compatibility filter 520 attaches back the metadata 506 to the suggestions 518 to enable ranking such as, for example, ranking popularity or filtering on pulse. The compatibility filter 520 also enables/allows a search to be execute over the recommended libraries (e.g., output of association recommender 512). The compatibility filter 520 may provide one or more filtered and augmented suggestions 524 of matching software libraries.

Also, if user 530 searches for a particular topic (e.g., "charts") the search result may be restricted to the ones relevant to a current set of recommended libraries (e.g., output of association recommender 512) filtered on the keyword matches with the library content indexer 510 (e.g., with semantic expansion or any other operation).

For example, if the user 530 searching "charts," one or more charting libraries which fit the user's 530 stack (automatically extracted from a package.json file of the user 530) may be returned. For example, the software library "Nivo" may be a first option, with a high compatibility score and a green check on licenses. On the hand, "HighChart," despite having "chart" in the name and description (which would be preferred it in a classic package search with mechanisms of the illustrated embodiments), may have a low ranking, with a warning on a commercial license with options. Thus, the present invention allows to search for topics with provided project root packages that may receive software library results, without a name or description that include the provided search. The software library results (not having the name and description relating to the search query) provided may also have a score higher than other software libraries that do include a name or description relating to the search query.

The compatibility filter 520 may augment and filter the recommendations from the association recommender 512 based on the results from the library content indexer 510. The compatibility filter 520 may takes as input the results from both the association recommender 512 and the library content indexer 510. If the user 530 provided some keywords, the library content indexer 510 may be queried to have the list of matching libraries 516 matching the given keywords. The compatibility filter 520 may merge the results from the association recommender 512 with the metadata from the library content indexer 510. If the user 530 provided some keywords, the compatibility filter 520 may filter and/or rank the suggested libraries (e.g., suggestions 534) based on the matching libraries 516 from the library content indexer 510. If the user does not provide keywords, the filtering and/or ranking operations may be based on most confident recommendations. It should be noted that recommended libraries comes with metadata, thus a user 530 that can perform custom sorting (or filtering) based on license, pricing, project activity, security score, etc.

Figure 6:
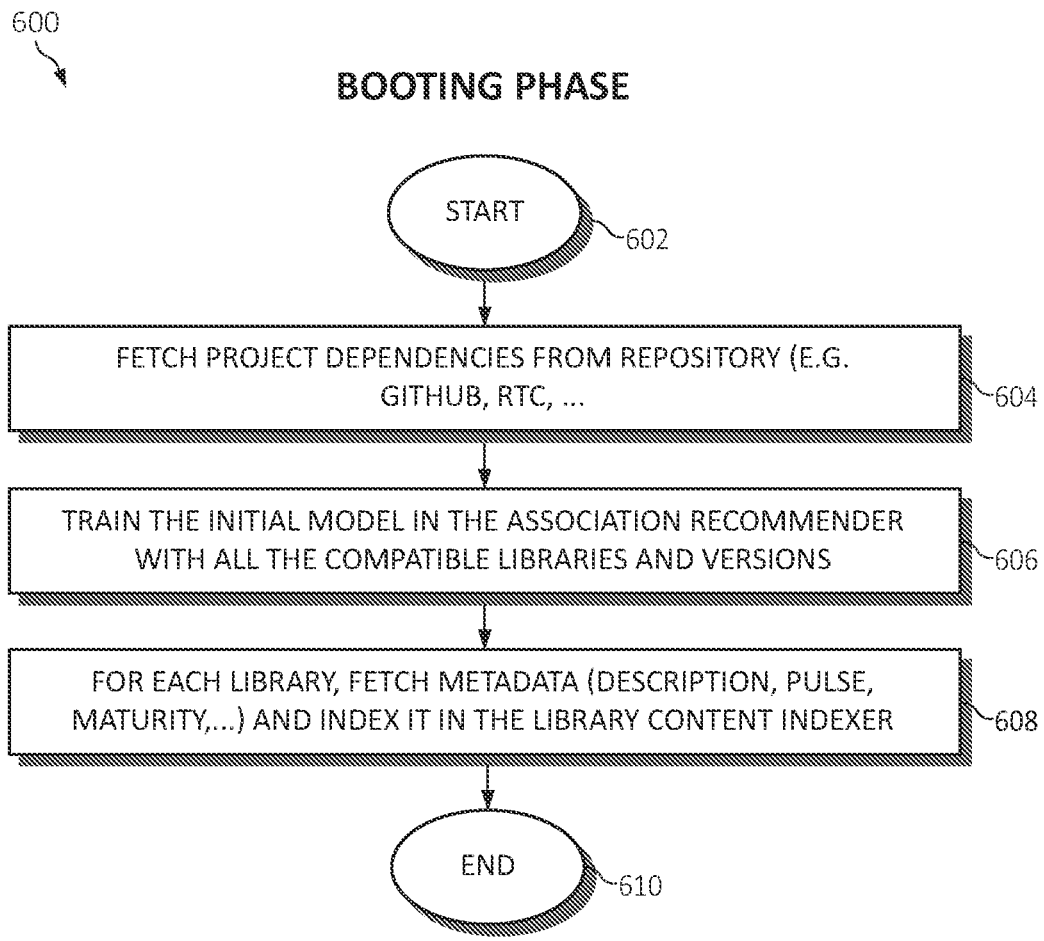
FIG. 6 is a flowchart diagram depicting an exemplary method for providing a booting phase for providing intelligent application library management in a computing environment by a processor in which aspects of the present invention may be realized.

Turning now to FIG. 6, a method 700 for providing a booting phase for providing intelligent application library management in a computing environment is depicted. The functionality 600 may be implemented as a method executed as instructions on a machine, where the instructions are included on at least one computer readable medium or on a non-transitory machine-readable storage medium. The functionality 600 may start in block 602.

One or more application project dependencies may be fetched from one or more repositories, as in block 604. In one aspect, repositories may be managed by an integrated development environment (e.g. custom library management) and/or local directories and/or application/software development platforms such as, for example, GitHub®, etc., that enable one or more users to share and collaboratively develop software, computer code and user-generated content. An initial machine learning model may be trained in an association recommender with all compatible libraries and versions, as in block 606. For each of the libraries, metadata (e.g., description, pulse, maturity, etc.) may be fetched and indexed in a library content indexer, as in block 608. The functionality 600 may end in block 610.

Figure 7:
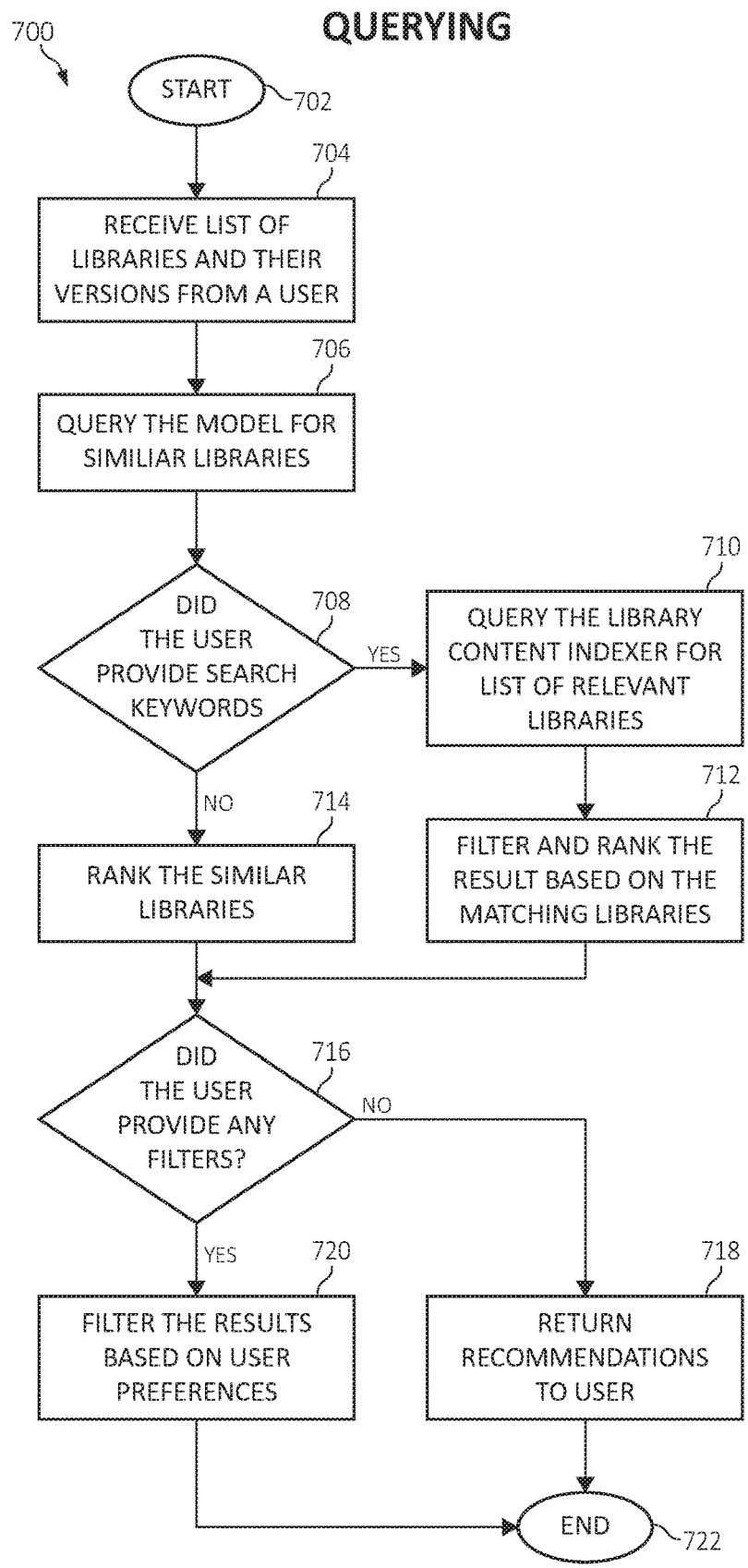
FIG. 7 is a flowchart diagram depicting an exemplary method for querying an optimized intelligent libraries management in a computing environment by a processor in which aspects of the present invention may be realized.

Turning now to FIG. 7, a method 700 for querying an intelligent library manager in a computing environment is depicted. The functionality 700 may be implemented as a method executed as instructions on a machine, where the instructions are included on at least one computer readable medium or on a non-transitory machine-readable storage medium. The functionality 700 may start in block 702.

A list of libraries and each of the versions of the libraries may be received (e.g., form a user), as in block 704. A query may be executed to search for similar and/or related libraries, as in block 706. A determination operation may be performed to determine if the query includes keywords for searching (e.g., did the user provide search keywords), as in block 708. If yes at block 708 (e.g., the user provided search keywords), a content library indexer may be queried for a list of relevant libraries (e.g., relevant to the keywords provided in the query), as in block 710. The query results may be filtered and ranked based on the matching libraries, as in block 712. The method 700 may move from block 712 to block 716

Returning to block 708, if no at block 708 (e.g., the user did not provide search keywords), similar libraries (e.g., the similar libraries found at block 706) may be ranked, as in block 714.

At block 716, a determination operation may be performed to determine if one or more filters are provided (e.g., did the user provide filters). If no at block 716, one or more library recommendations may be returned/provided (e.g., provided to a user), as in block 718. From block 718, the method 700 may move to block 722. If yes at block 716, ranked results (e.g., results from block 714 and/or 712) may be filtered based on one or more preferences (e.g., user preferences), as in block 720. The functionality 700 may end in block 722.

Figure 8:
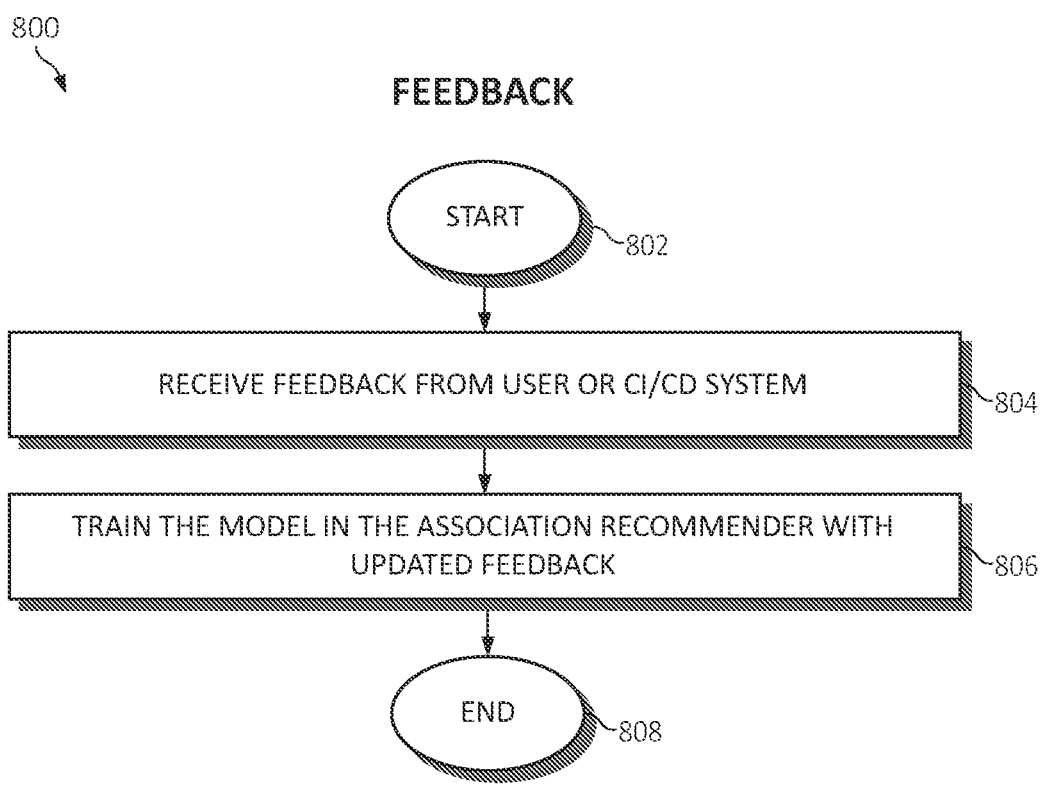
FIG. 8 is a flowchart diagram depicting an exemplary method for collecting feedback for providing intelligent application library management in a computing environment by a processor in which aspects of the present invention may be realized.

Turning now to FIG. 8, a method 800 for collecting feedback for providing intelligent application library management in a computing environment is depicted. The functionality 800 may be implemented as a method executed as instructions on a machine, where the instructions are included on at least one computer readable medium or on a non-transitory machine-readable storage medium. The functionality 800 may start in block 802.

Feedback data may be collected and/or received from a user and/or a computing system (e.g., a continuous integration "CI" and/or continuous delivery "CD" ("CI/CD") system, as in block 804. A machine learning model (e.g., a machine learning model in an association recommender) may be trained with updated feedback (e.g., collected, received, and/or updated feedback), as in block 806. The functionality 800 may end in block 808.

Figure 9:
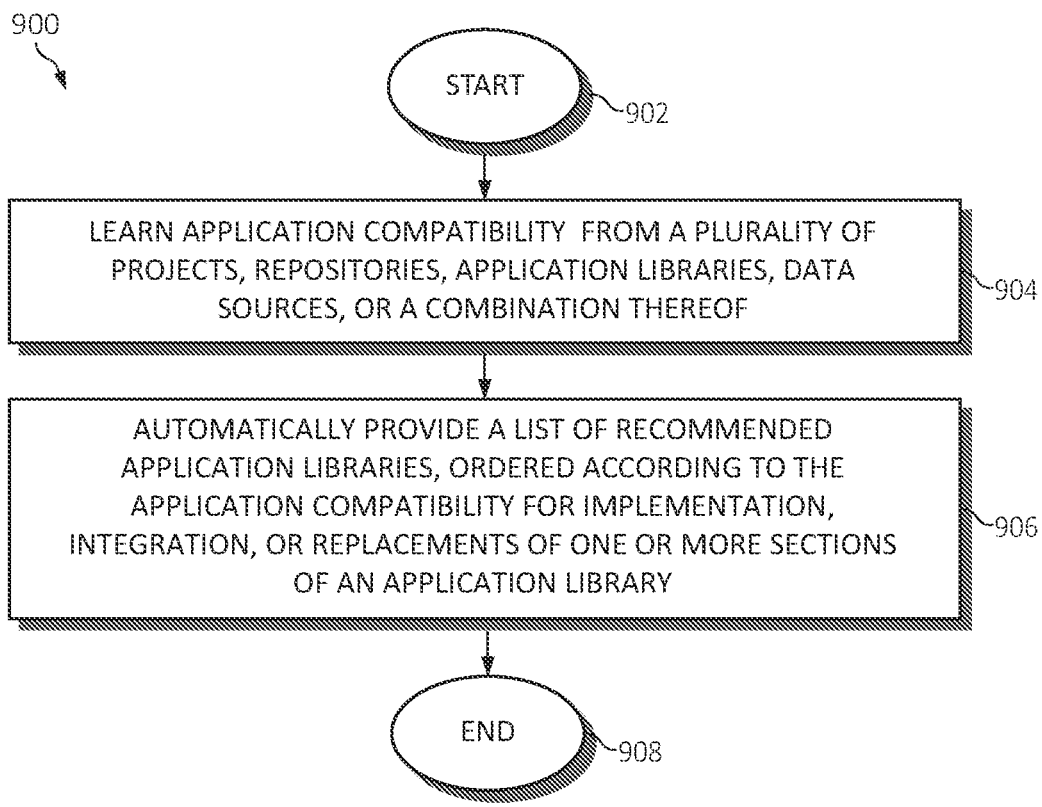
FIG. 9 is a flowchart diagram depicting an exemplary method for providing intelligent application library management in a computing environment by a processor, again in which aspects of the present invention may be realized.

Turning now to FIG. 9, a method 900 for providing intelligent application library management in a computing environment in a computing environment is depicted. The functionality 900 may be implemented as a method executed as instructions on a machine, where the instructions are included on at least one computer readable medium or on a non-transitory machine-readable storage medium. The functionality 900 may start in block 902.

Application compatibility may be learned from a plurality of projects, repositories, application libraries, data sources, or a combination thereof, as in block 904. A list of recommended application libraries, ordered according to the application compatibility, may be automatically provided for implementation, integration, or replacements of one or more sections of an application library, as in block 906. The functionality 900 may end in block 908.

In one aspect, in conjunction with and/or as part of at least one block of FIG. 9 the operations of method 900 may include each of the following. The operations of method 900 may search or crawl the one or more application projects, repositories, the plurality of application libraries, data sources, or a combination thereof to identify and learn content therein. The operations of method 900 may recommend a list of application libraries from the one or more application projects, repositories, a plurality of application libraries, data sources, or a combination thereof to add or modify the one or more sections of the one or more application projects. The operations of method 900 may indicate those of the list of recommended application libraries being potentially incompatible with one or more application projects.

The operations of method 900 may retrieve for the plurality of application libraries the list of recommended libraries, metadata, or a combination thereof and/or create a semantic index from the list of recommended libraries. The operations of method 900 may provide the list of recommended libraries matching a defined query.

The operations of method 900 may rank the list of recommended libraries according to the application compatibility for implementation, integration, or replacements of one or more sections of one or more application projects, and/or initiate a machine learning component to collect feedback and learn the one or more application projects from the plurality of application libraries, the data sources, or a combination thereof.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for providing intelligent library management in a computing environment, comprising:
    learning, using a machine learning component, application compatibility from one or more application projects, repositories, a plurality of application libraries, data sources, or a combination thereof;
    automatically providing a list of predicted application libraries, ordered according to the application compatibility of an application-pair for implementation, integration, or replacement of one or more sections of an application library, wherein the application-pair is identified according to a compatibility model trained from the learned application compatibility, wherein the list of predicted application libraries is ranked according to the application compatibility for implementation, integration, or replacement of one or more sections of one or more application projects, and wherein the providing of the list of predicted application libraries is performed inclusively for a previously unknown application-pair; and
    collecting feedback, using the machine learning component, to perform the learning of the application compatibility of the one or more application projects from the plurality of application libraries, the data sources, or a combination thereof.

2. The method of claim 1, further including searching or crawling the one or more application projects, repositories, a plurality of application libraries, data sources, or a combination thereof to identify and learn content therein.

3. The method of claim 1, wherein the list of predicted application libraries is identified from the one or more application projects, repositories, the plurality of application libraries, data sources, or a combination thereof to add or modify the one or more sections of the one or more application projects.

4. The method of claim 1, further including indicating those of the list of predicted application libraries being incompatible with one or more application projects.

5. The method of claim 1, further including:
    retrieving, from the plurality of application libraries, those application libraries on the list of predicted application libraries, metadata, or a combination thereof; and
    creating a semantic index for the list of predicted application libraries.

6. The method of claim 1, further including providing the list of predicted application libraries matching a defined query.

7. A system for providing intelligent library management in a computing environment, comprising:
    one or more computers with executable instructions that when executed cause the system to:
        learn, using a machine learning component, application compatibility from one or more application projects, repositories, a plurality of application libraries, data sources, or a combination thereof;
        automatically provide a list of predicted application libraries, ordered according to the application compatibility of an application-pair for implementation, integration, or replacement of one or more sections of an application library, wherein the application-pair is identified according to a compatibility model trained from the learned application compatibility, wherein the list of predicted application libraries is ranked according to the application compatibility for implementation, integration, or replacement of one or more sections of one or more application projects, and wherein the providing of the list of predicted application libraries is performed inclusively for a previously unknown application-pair; and
        collect feedback, using the machine learning component, to perform the learning of the application compatibility of the one or more application projects from the plurality of application libraries, the data sources, or a combination thereof.

8. The system of claim 7, wherein the executable instructions when executed cause the system to search or crawl the one or more application projects, repositories, the plurality of application libraries, data sources, or a combination thereof to identify and learn content therein.

9. The system of claim 7, wherein the list of the predicted application libraries is identified from the one or more application projects, repositories, the plurality of application libraries, data sources, or a combination thereof to add or modify the one or more sections of the one or more application projects.

10. The system of claim 7, wherein the executable instructions when executed cause the system to indicate those of the list of predicted application libraries being incompatible with one or more application projects.

11. The system of claim 7, wherein the executable instructions when executed cause the system to:
retrieve, from the plurality of application libraries, those application libraries on the list of predicted application libraries, metadata, or a combination thereof; and
create a semantic index for the list of predicted application libraries.

12. The system of claim 7, wherein the executable instructions when executed cause the system to provide the list of predicted application libraries matching a defined query.

13. A computer program product for providing intelligent library management by a processor, the computer program product comprising a non-transitory computer-readable storage medium having computer-readable program code portions stored therein, the computer-readable program code portions comprising:
an executable portion, executed by the processor, that uses a machine learning component to learn application compatibility from one or more application projects, repositories, a plurality of application libraries, data sources, or a combination thereof;
an executable portion, executed by the processor, that automatically provides a list of predicted application libraries, ordered according to the application compatibility of an application-pair for implementation, integration, or replacement of one or more sections of an application library, wherein the application-pair is identified according to a compatibility model trained from the learned application compatibility, wherein the list of predicted application libraries is ranked according to the application compatibility for implementation, integration, or replacement of one or more sections of one or more application projects, and wherein the providing of the list of predicted application libraries is performed inclusively for a previously unknown application-pair; and
an executable portion, executed by the processor, that uses the machine learning component to collect feedback to perform the learning of the application compatibility of the one or more application projects from the plurality of application libraries, the data sources, or a combination thereof.

14. The computer program product of claim 13, further including an executable portion, executed by the processor, that:
searches or crawls the one or more application projects, repositories, the plurality of application libraries, data sources, or a combination thereof to identify and learn content therein;
wherein the list of predicted application libraries is identified from the one or more application projects, the repositories, the plurality of application libraries, the data sources, or the combination thereof to add or modify the one or more sections of the one or more application projects.

15. The computer program product of claim 13, further including an executable portion, executed by the processor, that indicates those of the list of predicted application libraries being incompatible with one or more application projects.

16. The computer program product of claim 13, further including an executable portion, executed by the processor, that:
retrieves, from the plurality of application libraries, those application libraries on the list of predicted application libraries, metadata, or a combination thereof; and
creates a semantic index for the list of predicted application libraries.

17. The computer program product of claim 13, further including an executable portion, executed by the processor, that provides the list of predicted application libraries matching a defined query.

* * * * *